March 13, 1951 I. E. GROSDOFF 2,545,083

HIGH-SPEED SWITCHING CIRCUIT

Filed March 30, 1948

INVENTOR

IGOR E. GROSDOFF

BY Morris A. Rabkin

ATTORNEY

Patented Mar. 13, 1951 2,545,083

UNITED STATES PATENT OFFICE 2,545,083

HIGH-SPEED SWITCHING CIRCUIT

Igor E. Grosdoff, Princeton, N. J., assignor to Radio Corporation of America, a corporation of Delaware Application March 30, 1948, Serial No. 18,054

3 Claims. (Cl. 250—27)

This invention relates to high speed switching circuits such as are adapted to open and close an output circuit within a time interval which is shorter than the period of oscillations having a frequency of the order of ten megacycles.

This improved high speed switching circuit includes a driver tube of the pentode type to the control grid of which oscillations are applied and to the screen grid of which is applied a bias potential determined by the conductive state of a pair of thyratrons or gaseous conduction tubes which are normally biased to cutoff.

Through a first start push button switch, a positive potential is applied to the grid of one of the thyratrons, thus producing at its cathode a more positive potential which is applied to the screen grid of the driver tube and to a run indicator. As a result, oscillations are supplied through the driver tube and the run indicator is energized.

Through a second push button switch, a positive potential is applied to the grid of the other thyratron and it begins to conduct current thereby reducing the screen grid potential of the driver tube, interrupting the supply of oscillations, and deenergizing the run indicator.

By momentarily opening a reset push button switch with the run and stop push button switches open, the switching circuit is established in its standby condition with the thyratrons not conducting current and with a stop indicator deenergized.

With the various component parts of the improved switching circuit having the values indicated by the legends placed adjacent to them, it is operable within a time interval shorter than the period of oscillations having a frequency of ten megacycles. It thus affords a ready and accurate means of supplying predetermined numbers of such oscillations to an external circuit. It is of course evident that the run and stop control potentials may be applied from any suitable source other than the run and stop push button switches mentioned above.

The invention has for its object to provide an improved switching circuit which requires a minimum of component parts and is operable at a very high speed.

The invention will be better understood from the following description considered in connection with the accompanying drawings and its scope is indicated by the appended claims.

Referring to the drawings.

Figure 1:
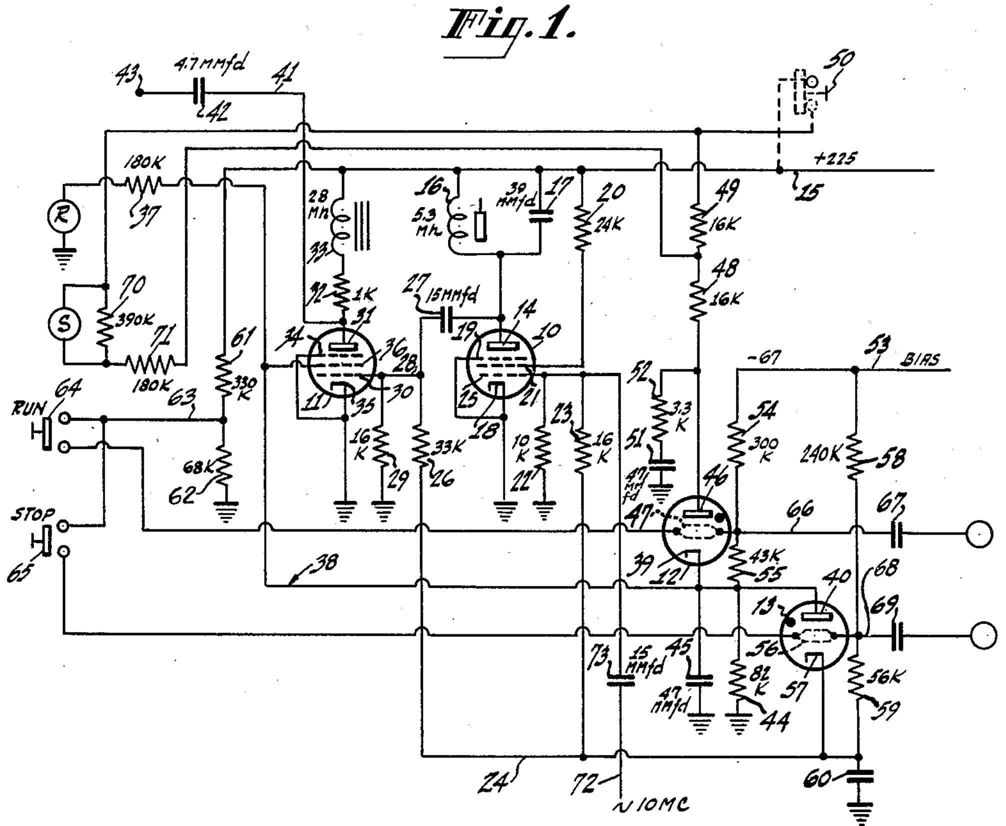
Figure 1 is a wiring diagram of a preferred form of the invention.

The circuit of Figure 1 includes an amplifier tube 10, a driver tube 11, a run tube 12 and a stop tube 13. The tubes 10 and 11 may be pentodes of the 6AK6 type. The tubes 12 and 13 are thyratrons of the 2D21 type.

The amplifier tube 10 includes (1) an anode 14 which is connected to a +225 volt lead 15 through an inductor 16 shunted by a capacitor 17, (2) a cathode 18 which is grounded, (3) a suppressor grid 19 which is also grounded, (4) a screen grid 21 which is connected to the +225 volt lead 15 through a resistor 20, (5) a control grid 25 which is connected (*a*) to ground through a resistor 22, (*b*) through a resistor 23 to a —20 volt lead 24, and (*c*) to the source of 10 mc. through a capacitor 73. The lead 24 is also connected through a resistor 26 and a capacitor 27 to the anode 14.

Assuming the various component parts of the device to have the values indicated by the legends placed adjacent these parts, oscillations having a frequency of ten megacycles are made available at a lead 28 which is connected to ground through a resistor 29. These oscillations are applied to the control grid 30 of the driver tube 11.

The driver tube 11 includes (1) an anode 31 which is connected to the lead 15 through a resistor 32 and an inductor 33, (2) a suppressor grid 34 and a cathode 35 which are grounded, and (3) a screen grid 36 which is connected through a resistor 37 to an indicator R and through a lead 38 to the cathode 39 of the run tube 12 and to the anode 40 of the stop tube 13. Oscillations having a frequency of ten megacycles are supplied from the anode 31 through a lead 41 and a capacitor 42 to a switch output lead 43 only when the potential of the screen grid is made sufficiently positive by the voltage drop of a resistor 44 which is connected between the cathode 39 and ground and is shunted by a capacitor 45.

In addition to the cathode 39, the run tube 12 includes an anode 46 and a pair of interconnected grids 47. The anode 46 is connected to the lead 15 through resistors 48 and 49 and a switch reset push button 50 and is also connected to ground through a capacitor 51 and a resistor 52 which function to shape the pulses produced on the lead 38 so that their front edge is substantially square. Bias potential from a −67 volt lead 53 is applied to the grids 47 by way of resistors 54, 55 and 44. These resistors determine voltage relation between the grids 47 and the cathode 39 and also determine the potential of the lead 38 which is also the potential at the screen 36 of the tube 11. This is substantially the ground potential before the tube 12 breaks down. Such bias potential maintains the run tube 12 in a non-conductive condition so long as no other potential is applied to the grids 47.

In addition to the anode 40, the stop tube 13 includes (1) a pair of interconnected grids 56 which have bias potential applied to them from the lead 53 by way of resistors 58 and 59, and (2) a cathode 57 which is connected to the −20 volt lead 24. This lead is connected to ground through a bypass capacitor 60.

A positive potential for the starting conduction through the run tube 12 and the stop tube 13 is derived from the lead 15 through the medium of resistors 61 and 62, the latter of which is grounded at its low voltage terminal. Through a lead 63 common to the resistors 61 and 62 and the push buttons 64 and 65 a positive control voltage may be applied to either of the grids 47 and 56. Such a signal voltage also may be applied from another source (not shown) through a lead 66 and a capacitor 67 or through a lead 68 and a capacitor 69.

A stop indicator S is energized by decrease in the voltage drop of the resistor 49 and is connected to the low voltage terminal of this resistor through the medium of resistors 70 and 71.

In the open condition of the switching circuit described above, the push button 50 is closed, the push buttons 64 and 65 are open, no current is conducted by the thyratron 12, the screen grid 36 is at substantially ground potential and no oscillations are supplied from the anode 31 to the lead 41.

Such a supply of oscillations is started by closing the push button 64 through which a positive potential is applied to the grids 47 of the tube 12. As a result this tube starts to conduct current through the resistor 44, the potential of the screen grid 36 is made more positive and oscillations are delivered from the anode 31. At the same time, this more positive voltage is applied to the run indicator which is energized.

The supply of oscillations to the lead 41 is stopped by closing the switch 65 as a result of which a positive potential is applied to the grids 56 of the tube 13, this tube conducts current and provides a low resistance shunt path to the −20 volt lead 24, and the potential of the lead 38 and grid 36 is reduced to a value such that oscillations are no longer supplied to the lead 41. At this time, the run indicator is extinguished and the stop indicator energized. The latter is due to the increased voltage drop across the resistor 49.

Since the tubes 12 and 13 are thyratrons (tubes of the gaseous conduction type), they continue to conduct current after the push buttons 64 and 65 are opened thus maintaining the switching circuit in a closed condition. Current conduction of the tubes 12 and 13 is interrupted by momentarily opening the reset push button 50. When conduction of the tubes 12 and 13 is thus interrupted, the lower terminal of the resistor 49 assumes a potential substantially equal to that of the lead 115 and the indicator S is deenergized.

Figure 2:
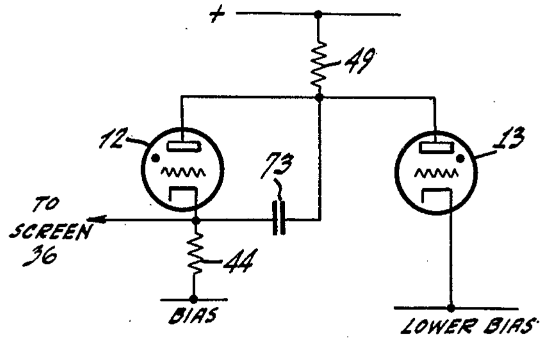
Figure 2 illustrates a detail of a modified form of the invention.

As indicated by Figure 2, the connections of the tubes 12 and 13 may be modified so that (1) these tubes are connected in parallel, (2) one bias potential is applied to the cathode of the tube 12 through the resistor 44 and (3) a lower bias potential is applied to the cathode of the tube 13. A capacitor 73 may be connected between the cathode of the tube 12 and the anode of the tube 13 for speeding up the action of the circuit. The other connections of this modification of the invention are the same as those illustrated by Figure 1.

What the invention provides is an improved switching circuit which has a minimum of component parts and is readily operated to control the supply of oscillations to an external circuit.

I claim as my invention:

1. A high speed switching circuit including first and second gaseous conduction devices each having a grid arranged to control conduction of current between its anode and cathode, means for applying to said grids a potential whereby said devices are biased to cutoff, a common output lead for said devices, means interconnecting said devices so that a more positive potential is applied to said lead when the first of said devices conducts current and a more negative potential is applied to said lead when both of said devices conduct current, a switching circuit output lead, a driver tube having an anode and a pair of grids one of which is connected to said lead, means including an amplifier for applying oscillations to the other grid of said driver tube, means for applying operating potential to said amplifier, a capacitor and an inductor connected in parallel between said operaing potential applying means and the anode of said amplifier, means for deriving oscillations from the anode of said driver tube when the potential of said lead is more positive, and means independent of the potential of said lead for interrupting said oscillations.

2. A high speed switching circuit as recited in claim 1 wherein said means interconnecting said devices so that a more positive potential is applied to said common output lead when the first of said devices conducts current and a more negative potential is applied to said lead when both of said devices conduct current comprises an anode load resistor connected to the anodes of both said devices, a cathode load resistor connected to the cathode of said first device, said common output lead also being coupled to said cathode of said first device, and a condenser connected between the anodes of both said devices and said cathode of said first device.

3. A high speed switching circuit including first and second gaseous conduction devices each having grid, cathode and anode electrodes, means to bias said tubes to cut off, a cathode load resistor connected to said first tube cathode, an anode load resistor connected to the anodes of said first and second gaseous conduction devices, a condenser connected between the anodes of said gaseous conduction devices and the cathode of said first device, a common output lead for said devices connected to the cathode of said first device, means to apply a signal to said first device to render it conductive whereby said common output lead is at a positive potential, means to apply a signal to said second device to render it conductive whereby said common output lead is at a potential which is negative referred to said positive potential, a switching circuit output lead, and means connected to said common output lead and responsive to said positive potential for admitting oscillations to said switching circuit output lead and responsive to said negative potential for excluding oscillations from said switching circuit output lead.

IGOR E. GROSDOFF.

REFERENCES CITED

The following references are of record in the file of this patent:

UNITED STATES PATENTS

| Number | Name | Date |
|---|---|---|
| 2,301,195 | Bradford | Nov. 10, 1942 |
| 2,415,870 | Ryder | Feb. 18, 1947 |

OTHER REFERENCES

Gate Circuit by Tooley, Electronics, May 1946, pages 144 and 145.